United States Patent
Liston et al.

(10) Patent No.: US 9,904,883 B2
(45) Date of Patent: Feb. 27, 2018

(54) METHOD AND APPARATUS FOR TRACKING ASSETS IN ONE OR MORE OPTICAL DOMAINS

(71) Applicant: Cisco Technology, Inc., San Jose, CA (US)

(72) Inventors: Robert Edward Liston, Menlo Park, CA (US); Wai-tian Tan, Sunnyvale, CA (US); John George Apostolopoulos, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/130,239

(22) Filed: Apr. 15, 2016

(65) Prior Publication Data

US 2017/0300794 A1    Oct. 19, 2017

(51) Int. Cl.
*G06K 19/06* (2006.01)
*G06K 7/10* (2006.01)

(52) U.S. Cl.
CPC ... *G06K 19/06131* (2013.01); *G06K 7/10861* (2013.01); *G06K 19/0614* (2013.01)

(58) Field of Classification Search
CPC ......... G06K 19/06131; G06K 7/10861; G06K 19/0614
USPC .................. 235/491, 487, 494, 385
See application file for complete search history.

(56) References Cited

U.S. PATENT DOCUMENTS

| | | | |
|---|---|---|---|
| 3,497,239 A * | 2/1970 | Buhrer | G06K 7/10871 250/224 |
| 4,275,385 A | 6/1981 | White | |
| 6,354,502 B1 * | 3/2002 | Hagstrom | G06K 7/12 235/462.04 |
| 7,063,256 B2 * | 6/2006 | Anderson | B07C 7/005 235/385 |
| 7,180,420 B2 | 2/2007 | Maurer | |
| 7,201,316 B2 * | 4/2007 | Anderson | B07C 7/005 235/382 |
| 7,204,428 B2 * | 4/2007 | Wilson | G06K 19/06009 235/462.1 |
| 7,377,429 B2 * | 5/2008 | Anderson | B07C 7/005 235/375 |

(Continued)

OTHER PUBLICATIONS

Bednarz, Ann, "IT asset tracking system combined RFID, infrared for rack-level identification," Network World, http://www.networkworld.com/article/2218197/wireless/it-asset-tracking-system-combines-rfid--infrared-for-rack-level-identification.html, Sep. 2010.

(Continued)

*Primary Examiner* — Paultep Savusdiphol
(74) *Attorney, Agent, or Firm* — Ronald Fernando

(57) ABSTRACT

In one implementation, a method of tracking assets includes obtaining a first image in a first optical domain, where the first optical domain is characterized by a first frequency range. The method also includes detecting a tracking apparatus (e.g., a tag) within the first image in the first optical domain, where a first feature of the tracking apparatus serves as a beacon enabling optical discrimination of the tracking apparatus in the first frequency range. The method further includes determining information associated with the tracking apparatus based on the arrangement of a second feature of the tracking apparatus provided to convey a data set associated with the tracking apparatus.

18 Claims, 10 Drawing Sheets

(56) References Cited

U.S. PATENT DOCUMENTS

| | | | |
|---|---|---|---|
| 7,469,828 B2* | 12/2008 | Baker | G06Q 10/08 235/383 |
| 7,982,614 B2 | 7/2011 | Holm et al. | |
| 8,223,009 B2 | 7/2012 | Anderson et al. | |
| 8,253,583 B2 | 8/2012 | Chu et al. | |
| 8,360,323 B2* | 1/2013 | Widzinski, Jr. | G09F 3/0294 235/487 |
| 8,827,148 B2* | 9/2014 | Platt | G06Q 30/0241 235/375 |
| 8,924,548 B2 | 12/2014 | Frost et al. | |
| 9,064,229 B2 | 6/2015 | Chaves et al. | |
| 9,176,230 B2 | 11/2015 | Vartanian et al. | |
| 2003/0187538 A1* | 10/2003 | Somaia | G06Q 30/06 700/140 |
| 2004/0182925 A1* | 9/2004 | Anderson | B07C 7/005 235/385 |
| 2005/0116821 A1 | 6/2005 | Wilsey et al. | |
| 2005/0128293 A1 | 6/2005 | Wilsey et al. | |
| 2005/0240871 A1* | 10/2005 | Wilson | G06K 19/06009 715/700 |
| 2006/0092170 A1* | 5/2006 | Bathiche | A63F 13/02 345/589 |
| 2006/0266828 A1* | 11/2006 | Silverbrook | G06F 3/014 235/385 |
| 2007/0156281 A1* | 7/2007 | Leung | G06Q 10/08 700/225 |
| 2009/0207022 A1 | 8/2009 | Reckeweg et al. | |
| 2010/0025476 A1* | 2/2010 | Widzinski, Jr. | G09F 3/0294 235/488 |
| 2013/0229263 A1 | 9/2013 | Graczyk et al. | |
| 2013/0288719 A1 | 10/2013 | Alonzo | |
| 2014/0132412 A1 | 5/2014 | Deco et al. | |
| 2014/0151446 A1 | 6/2014 | Bovell | |
| 2014/0330685 A1 | 11/2014 | Nazzari | |
| 2015/0334355 A1 | 11/2015 | Ware et al. | |
| 2016/0229631 A1* | 8/2016 | Kimura | G05D 1/0291 |

OTHER PUBLICATIONS

"Vicon Tracker Guide 2.0," Vicon Motion Systems Ltd., Mar. 2013.

"Infrared Retroreflector Identification System," Hunter Safety Lab, http://www.huntersafetylab.com/iris/how-iris-works, last visited Apr. 2016.

Boyer, Tom, "IR + PL (Photo-luminescent) Patches," IR.Tools Identification Technology, http://infraredtools.com/irpl-photoluminescent-patches, Sep. 2015.

"IT Starts with Information: How Monitoring, Capacity Planning and Predictive Analysis Improve Data Center Efficiency and Facilitate Business Growth," RF Code Inc., Whitepaper, 2015.

Nota, et al., "Augmenting Real-world Objects by Detecting 'Invisible' Visual Markers," USIT '08, Oct. 19-22, 2008, Monterray, CA.

* cited by examiner

FIG. 4

METHOD AND APPARATUS FOR TRACKING ASSETS IN ONE OR MORE OPTICAL DOMAINS

TECHNICAL FIELD

The present disclosure generally relates to tracking assets such as objects and persons, and in particular, to systems, methods, and apparatuses for tracking assets in one or more optical domains.

BACKGROUND

Asset tracking is important for many industries. For example, a hospital may endeavor to track its equipment or a grocery store may want to track the movement of shopping carts for analytics purposes. As another example, a factory or construction site may want to track the whereabouts of workers to ensure their safety. In some situations, tracking assets in the visible domain is difficult due to low light conditions, excessive ambient light, obstructions, and the like.

Printed codes (e.g., QR codes and bar codes) may be used to track assets in the visible domain. However, printed codes are difficult to detect and read at a distance even under optimal lighting. Furthermore, a great amount of computational power may be needed to read such a code (e.g., 8 million pixels in a 4K image) without accounting for errors.

Radio frequency identification (RFID) tags may also be used to track assets in some situations. However, RFID tags cannot be read with geographic accuracy (e.g., approximately 1 to 3 meters of error). Furthermore, passive RFID tags do not convey info outside of their unique identification or serial number. On the other hand, active RFID tags are able to convey additional information, but active RFID tags are expensive and have limited power.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4 is a block diagram of an example data structure for a tracking database in accordance with some implementations.

Figure 1:
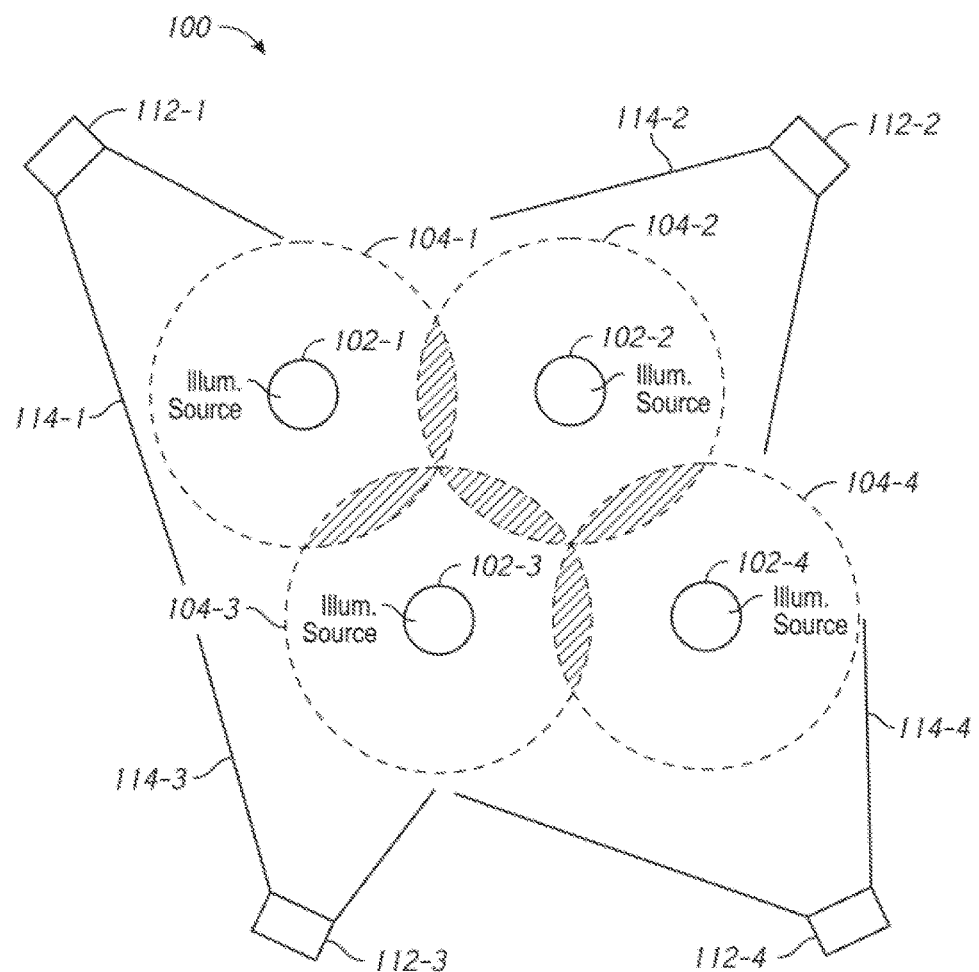
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein include systems, methods, and apparatuses for tracking assets (e.g., objects, fixtures, and/or persons). According to some implementations, an apparatus includes: a surface; a first feature on the surface provided to serve as a beacon enabling optical discrimination of the apparatus in a first frequency band; and a second feature on the surface provided to convey a data set associated with the apparatus, where the second feature is arranged in a predefined pattern in order to convey the data set.

According to some implementations, a method includes obtaining a first image in a first optical domain, where the first optical domain is characterized by a first frequency range. The method also includes detecting a tracking apparatus (e.g., a tag) within the first image in the first optical domain, where a first feature of the tracking apparatus serves as a beacon enabling optical discrimination of the tracking apparatus in the first frequency range. The method further includes determining information associated with the tracking apparatus based on the arrangement of a second feature of the tracking apparatus provided to convey a data set associated with the tracking apparatus.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

Example Embodiments

In general, tracking assets using tags that are detectable in the visible domain, such as printed codes, is difficult due to low light conditions, excessive ambient light, obstructions, and the like. According to some implementations, a tracking apparatus enables detection and reading in the infrared (IR) domain. According to some implementations, a tracking apparatus enables detection in a first optical domain (e.g., the IR domain) and reading in a second optical domain (e.g., the visible spectrum).

Infrared tracking apparatuses (e.g., tags) provide images that are easy to read in the IR domain as compared to the visual domain. When the viewing distance is great (e.g., tracking assets on a factory floor) bright spots tend to bleed and diffuse the underlying shape of the IR tag pattern. As a result, classical patterns based on QR codes are ineffective, since it will be difficult to tell a square apart from a rectangle formed by joining two squares. This motivates the use of a grid of small dot/no-dot pattern that yields high information density, compared to the use of "richer" alphabet that might include squares and rings. It is also necessary to determine the bounding box and orientation of the IR tag. Using only dots, there is a unique way to accomplish this, according to some implementations, by having a dot in three corners and a space or notch in the fourth corner to identify and orient the tag.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a plurality of illumination sources 102-1, 102-2, 102-3, and 102-4 (collectively referred to as "illumination sources 102" herein) with coverage areas 104-1, 104-2, 104-3, and 104-4 (collectively referred to as "coverage areas 104" herein), respectively. In some implementations, the illumination sources 102 emit electromagnetic radiation associated with a frequency band such as the visible light band, the infrared (IR) band, and/or the like. In some implementations, the illumination sources 102 are constantly enabled. In some implementations, the illumination sources 102 are enabled/disabled or otherwise modulated according to instructions from a controller (e.g., controller 210 in FIGS. 2-3).

According to some implementations, the operating environment 100 also includes a plurality of capture devices 112-1, 112-2, 112-3, and 112-4 4 (collectively referred to as the "capture devices 112" herein) with ranges (or fields of view) 114-1, 114-2, 114-3, and 114-4, respectively. For example, the capture devices 112 include image sensors that capture images in the visible domain, the IR domain, and/or other domains. In another example, the capture devices 112 include video cameras that capture video or frames in the visible domain, the IR domain, and/or other domains. In some implementations, at least a portion of the images or frames captured by the capture devices 112 is associated with one or more of the coverage areas 104.

Figure 2:
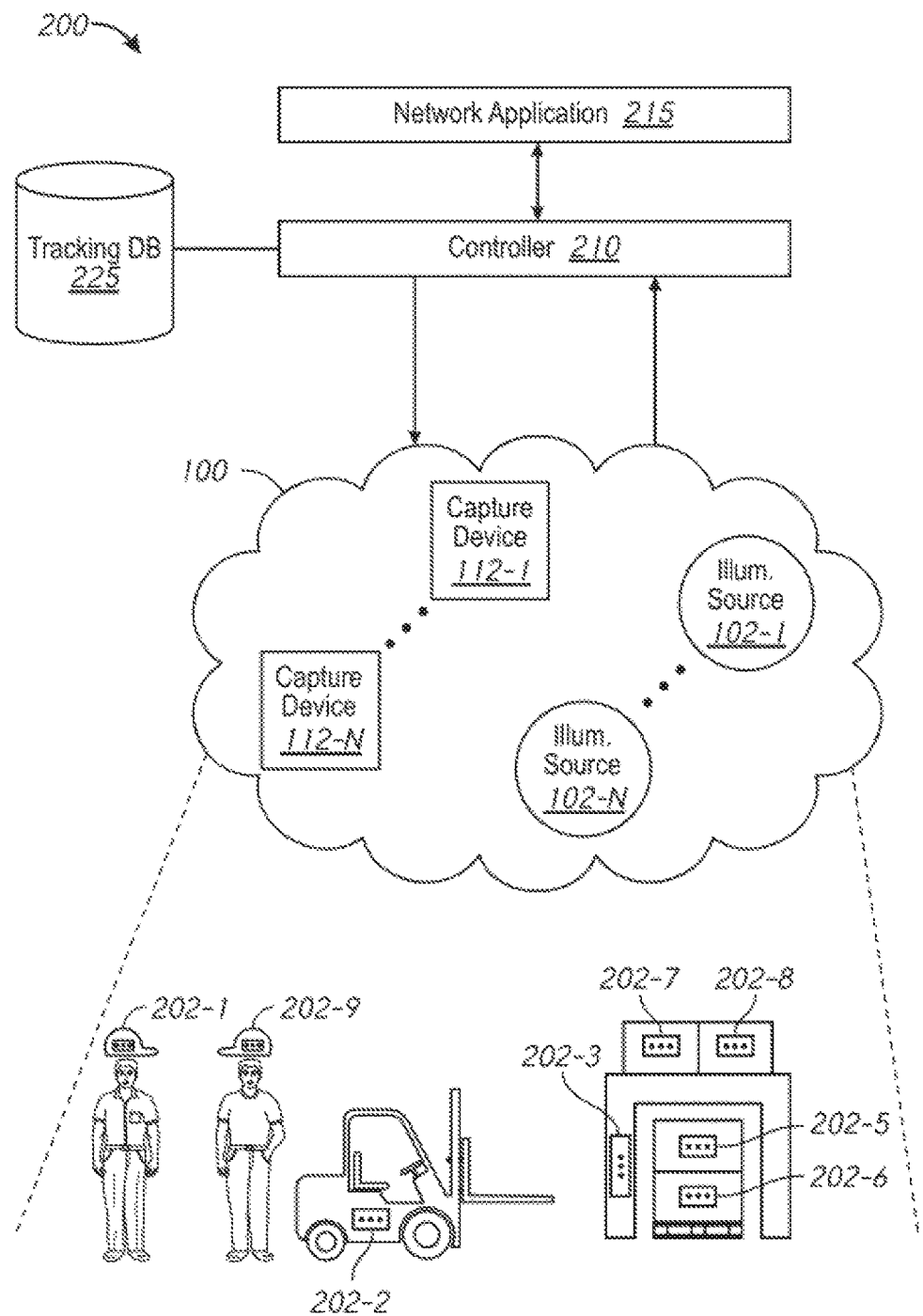
FIG. 2 is a block diagram of an example data processing network in accordance with some implementations.

FIG. 2 is a block diagram of an example data processing network 200 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. Elements common to FIGS. 1 and 2 include common reference numbers, and only the differences between FIGS. 1 and 2 are described herein for the sake of brevity. To that end, as a non-limiting example, the data processing network 200 includes a controller 210, a tracking database 225, a network application 215, the operating environment 100, and a plurality of tracking apparatuses 202-1, 202-2, 202-3, 202-5, 202-6, 202-7, 202-8, and 202-9 (collectively referred to as "tracking apparatuses 202" herein) associated with assets (e.g., objects, fixtures, or persons) within the operating environment 100. In some implementations, a tracking apparatus is attached or adhered to a corresponding asset (e.g., with glue, epoxy, VELCRO, or the like). In some implementations, a tracking apparatus is printed onto, etched into, extruded onto, or otherwise associated with the surface of a corresponding asset.

In some implementations, the controller 210 controls and facilitates the tracking of assets within the operating environment 100. According to some implementations, the controller 210 tracks a respective asset within the operating environment 100 by obtaining one or more images associated with the operating environment 100 from the capture devices 112, detecting a tracking apparatus (sometimes also referred to as a "tag" herein) within the one or more images, determining information associated with the tracking apparatus (e.g., a serial number associated with the corresponding asset), identifying the respective asset based on the determined information (e.g., the tracking database 225 is indexed according to serial numbers for assets), locating the tracking apparatus, and associating the location with the identified asset in the tracking database 225.

For example, as shown in FIG. 2, the operating environment 100 is associated with a warehouse. Continuing with this example, tracking apparatus 202-1 is attached or adhered to a hardhat which a first person (e.g., asset 1) within the operating environment 100 is wearing, tracking apparatus 202-2 is attached or adhered to a forklift (e.g., asset 2) within the operating environment 100, tracking apparatus 202-3 is attached or adhered to a shelving fixture (e.g., asset 3) within the operating environment 100, tracking apparatus 202-5 is attached or adhered to a first box (e.g., asset 4) within the operating environment 100, tracking apparatus 202-6 is attached or adhered to a second box (e.g., asset 5) within the operating environment 100, tracking apparatus 202-7 is attached or adhered to a third box (e.g., asset 6) within the operating environment 100, tracking apparatus 202-8 is attached or adhered to a fourth box (e.g., asset 7) within the operating environment 100, and tracking apparatus 202-9 is attached or adhered to a hardhat which a second person (e.g., asset 8) within the operating environment 100 is wearing. As such, in this example, workers within the warehouse are tracked in order to maintain their safety and supervise their whereabouts, tools or equipment within the warehouse are tracked to stop theft and loss, and goods within the warehouse are tracked to analyze efficiency and to stop loss. One of ordinary skill in the art will appreciate that asset tracking may be applied to many other scenarios such as to schools, hospitals, prisons or jails, fulfillment facilities, manufacturing facilities, or the like.

According to some implementations, the controller 210 controls the illumination sources 102. In some implementations, the controller 210 issues enable or disable commands to the illumination sources 102. In some implementations, the controller 210 is able to otherwise modulate the illumination sources 102 by setting their brightness and/or frequency range (e.g., visible or IR band) associated with the illumination sources 102.

According to some implementations, the controller 210 controls the capture devices 112. In some implementations, the controller 210 obtains images from capture devices 112 according to a predefined schedule (e.g., every 60, 90, 120, etc. seconds) and detects one or more tracking apparatuses within the images obtained from the capture devices 112. In some implementations, the controller 210 obtains images from capture devices 112 in response to a request from the controller 210 and detects one or more tracking apparatuses within the images obtained from the capture devices 112.

In some implementations, the network application 215 sets parameters for the controller 210 such as a predefined schedule for tracking assets and updating their locations. In some implementations, the network application 215 supplies instructions to the controller 210 such as an instruction to locate or track a specific asset. In some implementations, the tracking database 225 correlates identification information for an asset (e.g., an identity code or serial number for an object, fixture, or person) with characterization information associated with the asset (e.g., a visual signature, which is a function of one or more of a color histogram, feature profile, geometric profile, texture profile, etc. for the asset) and tracking information associated with the location(s) of the asset (e.g., sets of coordinates along with corresponding timestamps). The tracking database 225 is described in more detail herein with reference to FIG. 4.

Figure 3:
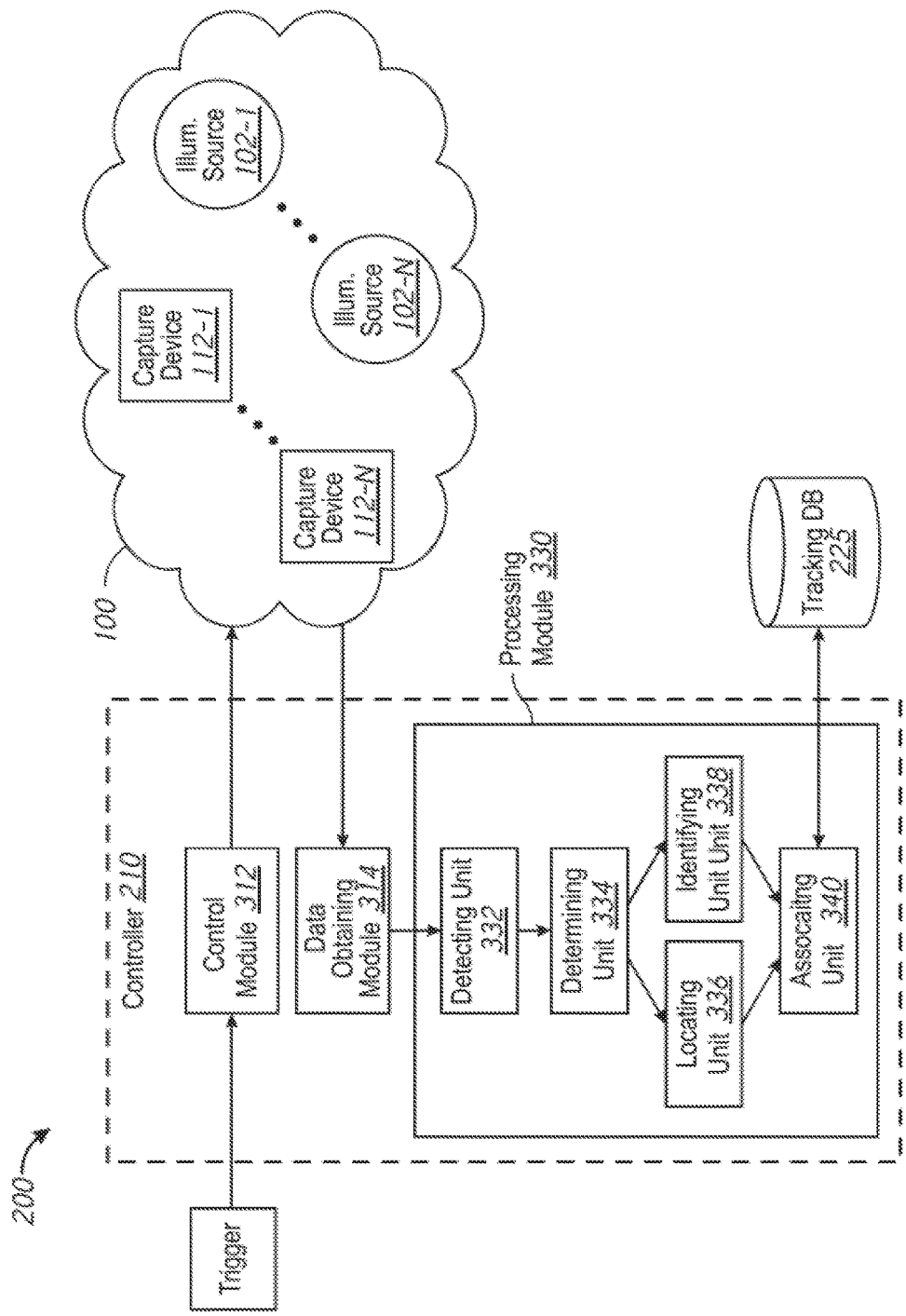
FIG. 3 is a block diagram of a portion of the data processing network in FIG. 2 in accordance with some implementations.

FIG. 3 is a block diagram of a portion of data processing network 200 in FIG. 2 in accordance with some implementations. Elements common to FIGS. 2 and 3 include common reference numbers, and only the differences between FIGS. 2 and 3 are described herein for the sake of brevity. To that end, the data processing network 200 includes the controller 210, the tracking database 225, and the operating environment 100 with the illumination sources 102 and the capture devices 112. According to some implementations, the controller 210 includes a control module 312, a data obtaining module 314, and a processing module 330.

In some implementations, the control module 312 controls the operation of the illumination sources 102 and the capture devices 112. In some implementations, the control module 312 issues a request to the capture devices 112 to capture images in response to a trigger (e.g., a request for a location of a specified asset or a predefined schedule for updating the locations of the assets). In some implementations, the control module 312 issues a request to modulate the illumination sources 102 (e.g., enable and disable, or increase and decrease brightness) in response to a trigger (e.g., a request for a location of a specified asset or a predefined schedule for updating the locations of assets).

In some implementations, the data obtaining module 314 obtains images from the capture devices 112. In one example, the data obtaining module 314 retrieves or receives images from each of the capture devices 112 according to a predefined schedule (e.g., every 60, 90, 120, etc. seconds). In another example, the data obtaining module 314 receives images from each of the capture devices 112 in response to a request for images from the control module 312.

In some implementations, the processing module 330 facilitates the tracking of assets within the operating environment 100. In some implementations, the processing module 330 includes a detecting unit 332, a determining unit 334, a locating unit 336, an identifying unit 338, and an associating unit 340.

In some implementations, the detecting unit 332 detects one or more tracking apparatuses within the images obtained by the data obtaining module 314. The detecting unit 332 is described in greater detail below with reference to FIGS. 8-10.

In some implementations, the determining unit 334 determines information associated with the one or more tracking apparatuses detected by the detecting unit 332. The determining unit 334 is described in greater detail below with reference to FIGS. 8-10.

In some implementations, the locating unit 336 determines a location for each of the assets associated with the one or more tracking apparatuses detected by the detecting unit 332. The locating unit 336 is described in greater detail below with reference to FIGS. 8-10.

In some implementations, the identifying unit 338 identifies an asset associated with each of the one or more tracking apparatuses based on the information for each of the one or more tracking apparatuses determined by the determining unit 334. The identifying unit 338 is described in greater detail below with reference to FIGS. 8-10.

In some implementations, the associating unit 340 associating the locations determined by the locating unit 336 with entries in the tracking database 225 corresponding to the assets identified by the identifying unit 338. The associating unit 340 is described in greater detail below with reference to FIGS. 8-10.

Figure 4:
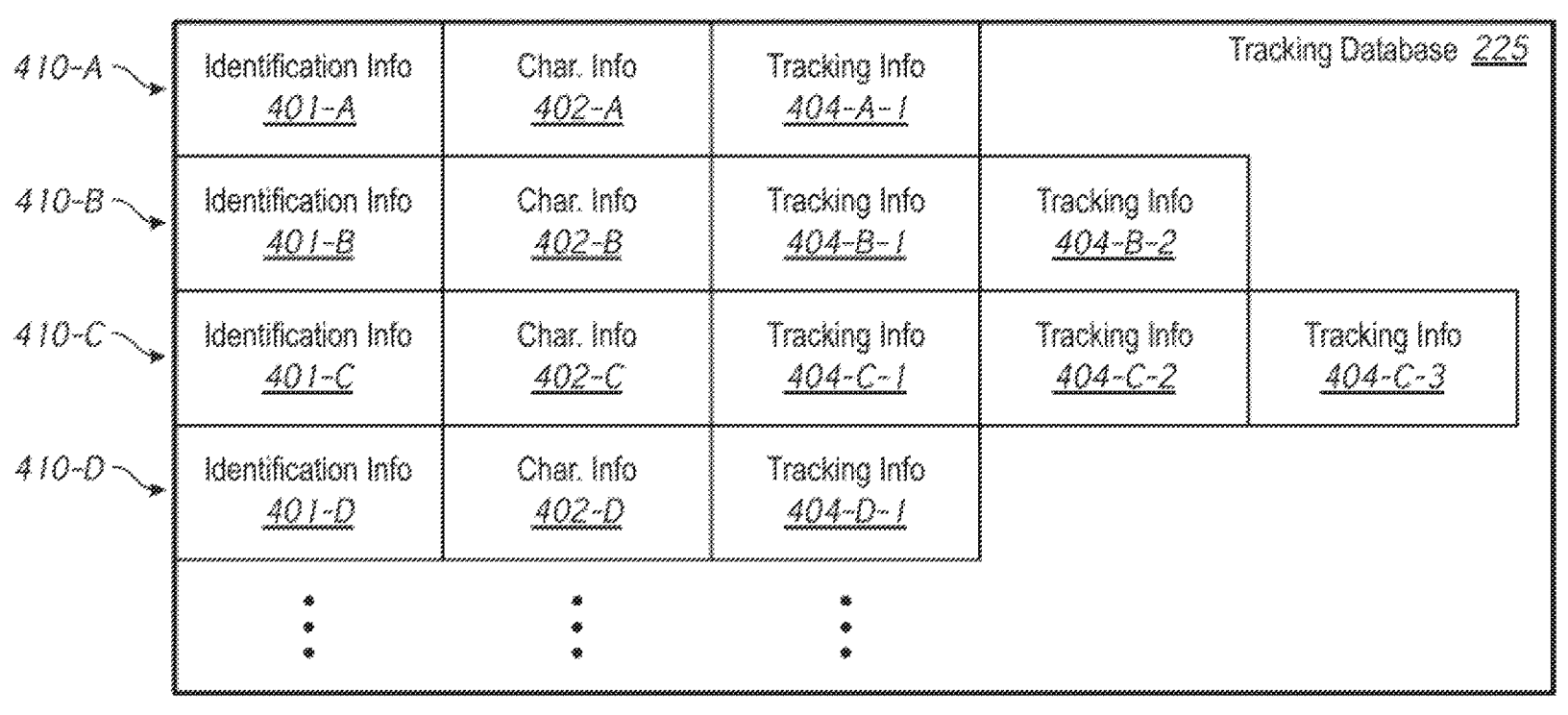

FIG. 4 is a block diagram of an example data structure for a tracking database 225 in accordance with some implementations. According to some implementations, the tracking database 225 includes a plurality of entries 410-A, 410-B, 410-C, 410-D, . . . (collectively referred to as "entries 410" herein), each of which corresponds to a unique asset (e.g., an object, fixture, or person). In some implementations, the tracking database 225 is populated, updated, and maintained by the controller 210 or a component thereof (e.g., the associating unit 340 in FIG. 3). As shown in FIG. 4, each entry 410 of the characterization database 225 is characterized by the following fields: identification information 401, characterization information 402, and one or more instances of tracking information 404.

According to some implementations, the identification information 401-A includes a unique identity code or serial number for the asset that corresponds to the row 410-A. For example, the tracking apparatus (e.g., a tag) that is adhered or attached to the asset that corresponds to the row 410-A has an encoded element arranged in a predefined pattern (e.g., a pattern of dots, a QR code, a barcode, etc.) that conveys the identification information 401-A. In another example, the tracking apparatus that is adhered or attached to the asset that corresponds to the row 410-A has a non-encoded element (e.g., an image or plain text) that conveys the identification information 401-A.

In some implementations, the characterization information 402-A includes information that characterizes the asset that corresponds to the row 410-A such as a visual signature for the asset. In some implementations, the visual signature is a function of one or more attributes, which include one or more of a color histogram, feature profile, geometric profile, texture profile, and the like for the asset. In some implementations, the tracking information 404-A-1 includes a timestamp and a set of coordinates (e.g., absolute coordinates or coordinates relative to the operating environment 100) associated with an instance that the asset that corresponds to the row 410-A was detected, identified, and located by the controller 210. For example, the entry 410-A is associated with one instance of tracking information 404-A-1 because the asset associated with the entry 410-A has been detected, identified, and located by the controller 210 one time.

In another example, the entry 410-B is associated with two instances of tracking information: tracking information 404-B-1 and tracking information 404-B-2. Continuing with this example, the tracking information 404-B-1 is associated with a first instance that the asset associated with the entry 410-B was detected, identified, and located by the controller 210 (e.g., time T), and the tracking information 404-B-2 is associated with a second instance that the asset associated with the entry 410-B was detected, identified, and located by the controller 210 (e.g., time T+1).

In yet another example, the entry 410-C is associated with three instances of tracking information: tracking information 404-C-1, tracking information 404-C-2, and tracking information 404-C-3. Continuing with this example, the tracking information 404-C-1 is associated with a first instance that the asset associated with the entry 410-C was detected, identified, and located by the controller 210 (e.g., time T), the tracking information 404-C-2 is associated with a second instance that the asset associated with the entry 410-C was detected, identified, and located by the controller 210 (e.g., time T+1), and the tracking information 404-C-3 is associated with a third instance that the asset associated with the entry 410-C was detected, identified, and located by the controller 210 (e.g., time T+2).

Figure 5:
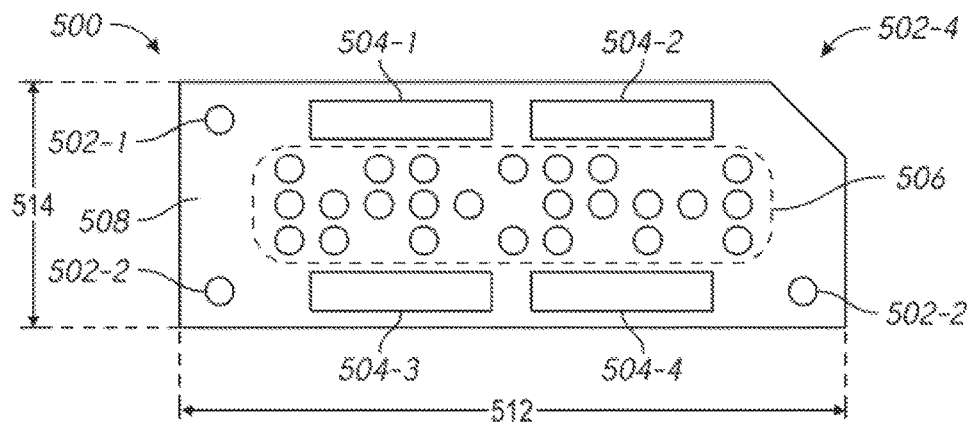
FIG. 5 is a representation of an example tracking apparatus in accordance with some implementations.

FIG. 5 is a representation of an example tracking apparatus 500 (e.g., a tag) in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, the tracking apparatus 500 includes: a substrate 508; a first feature including portions 504-1, 504-2, 504-3, and 504-4 (collectively referred to as the "first feature 504" herein) on a first side of the substrate 508; and a second feature 506 on the first side of the substrate 508. According to some implementations, the first feature 504 is a set of features that includes one or more portions such as portions 504-1, 504-2, 504-3, and 504-4, and the second feature 506 is set of features that includes one or more portions such as the dots within the dotted oval in FIG. 5.

According to some implementations, the first feature 504 and the second feature 506 are provided on a surface. In some implementations, the surface forms a portion of the asset corresponding to the tracking apparatus 500. As such, for example, the first feature 504 and the second feature 506 are printed onto, etched into, extruded onto, or other associated with the surface of the asset. In some implementations, the surface forms a portion of a substrate 508, which is attached or adhered to the asset corresponding to the tracking apparatus 500.

In some implementations, the first feature 504 and the second feature 506 are printed on the first side of the substrate 508. In some implementations, the first feature 504 and the second feature 506 are attached or adhered on the first side of the substrate 508. In some implementations, the substrate 508 has a first dimension 512 (e.g., the length) that satisfies a first condition (e.g., less than 9 inches) and a second dimension 514 (e.g., the width) that satisfies a second condition (e.g., less than 6 inches). In one example, the tracking apparatus 500 is 6 inches long and 4 inches wide.

In some implementations, the tracking apparatus 500 includes an adhesive provided on a second side of the substrate 508 opposite the first side, where the adhesive is provided to adhere the tracking apparatus 500 to a surface of an object or fixture (e.g., a box, a forklift, a hard hat, a shelving fixture, a hospital bed, a tray of medical equipment, etc.). For example, the tracking apparatus 500 is a sticker, and the adhesive is a glue or epoxy.

In some implementations, the first feature 504 is provided to serve as a beacon enabling optical discrimination of the tracking apparatus 500 in a first optical domain characterized by a first frequency range. In some implementations, the first frequency range corresponds to the infrared (IR) frequency band. In some implementations, the first feature 504 is formed from a material that fluoresces when excited by electromagnetic radiation associated with the first frequency range such as the IR band. As such, for example, the first feature 504 is a set of fluorescent stripes, dots, or other similar geometric shapes. In some implementations, the first feature 504 is formed from a material that reflects or retro-reflects electromagnetic radiation associated with the first frequency range such as the IR band. As such, for example, the first feature 504 is a set of reflective or retro-reflective stripes, dots, or other similar geometric shapes.

In some implementations, the second feature 506 is provided to convey a data set associated with the tracking apparatus 500. For example, the data set characterizes an asset that corresponds to the tracking apparatus 500 (e.g., an object, fixture, or person to which the tracking apparatus 500 is attached or adhered). In another example, the data set conveys a serial number or identification code.

In some implementations, the second feature 506 is arranged in a predefined pattern in order to convey the data set. For example, the second feature 506 is arranged in a predefined pattern such as the 3×10 grid of dots shown in FIG. 5. In another example, not shown, a 9×4 grid of reflective dots conveys a unique 16-bit check sequence with 16 parity bits is used for the tags, which allows for 64,000 unique tags. One of ordinary skill in the art will appreciate that various other encoding schemes and techniques may be used in other implementations.

For example, the predefined pattern is associated with a predetermined code that identifies an asset associated with the tracking apparatus 500 (e.g., a serial number for the asset to which the tracking apparatus 500 is attached or adhered). In another example, the predefined pattern characterizes the asset associated with the tracking apparatus 500. For example, the predefined pattern is associated with the geometric shape, color, size, volume, owner or operator, age, and/or the like of the asset associated with the tracking apparatus 500.

In some implementations, the second feature 506 is the same as the first feature 504 (e.g., as shown in FIGS. 6A-6D). As such, the second feature 506 also serves as a beacon enabling optical discrimination of the apparatus in a first frequency band. In some implementations, the first feature 504 and the second feature 506 both enable detection of the tracking apparatus 500 and conveyance of the data set.

Figure 7:
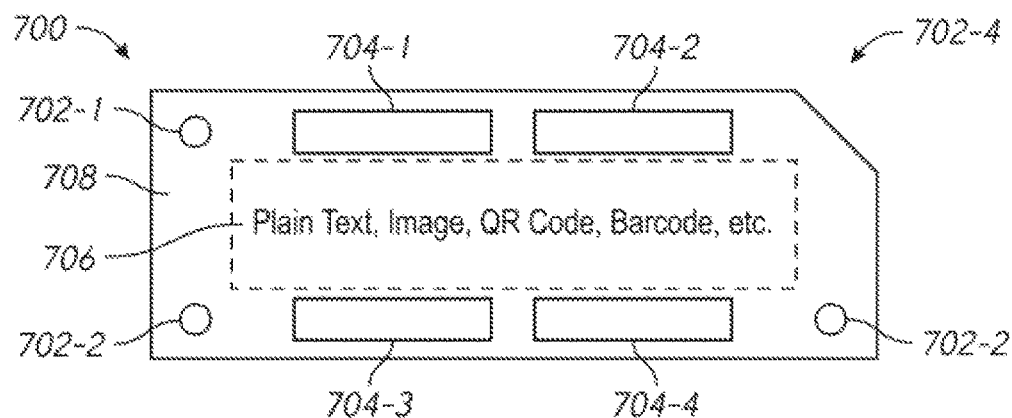
FIG. 7 is a representation of yet another example tracking apparatus in accordance with some implementations.

In some implementations, the second feature 506 is distinct from the first feature 504 (e.g., as shown in FIGS. 5 and 7). As such, the second feature 506 does not serve as a beacon enabling optical discrimination of the apparatus in a first frequency band. In some implementations, the first feature 504 enables detection of the apparatus in a first optical domain characterized by a first frequency range (e.g., the IR band), and the second feature 506 conveys a data set in a second optical domain characterized by a second frequency range (e.g., the visible spectrum).

In some implementations, the tracking apparatus 500 optionally includes a third feature including portions 502-1, 502-2, 502-3, and 502-4 (collectively referred to as the "third feature 502" herein) on a first side of the substrate 508. In some implementations, third feature 502 is provided to enable identification of at least one of the orientation or pitch of the tracking apparatus 500. In some implementations, the third feature 502 enables proper determination of the data set associated with the second feature 506. For example, the predefined pattern associated with the second feature 504 may be decoded incorrectly if the orientation of the tracking apparatus 500 is not determined (e.g., the second feature 504 is upside down in an image). According to some implementations, the third feature 502 does not comprise part of the information bearing pattern associated with the second feature 504. For example, as shown in FIG. 5, the portions 502-1, 502-2, and 502-3 occupy respective corners of the tracking apparatus 500, and the portion 502-4 is a notch in the substrate 508 that occupies a respective corner of the tracking apparatus 500.

In some implementations, the third feature 502 is printed on the first side of the substrate 508. In some implementations, the third feature 502 is attached or adhered on the first side of the substrate 508. In some implementations, the third feature 502 is included in the second feature 506 (e.g., as shown in FIGS. 6A-6D). In some implementations, the third feature 502 is distinct from the second feature 506 (e.g., as shown in FIGS. 5 and 7).

Figure 6A:
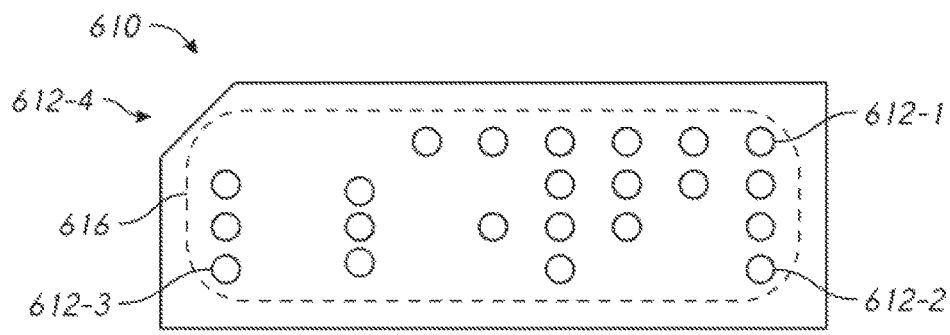
FIGS. 6A-6D show representations of other example tracking apparatuses in accordance with some implementations.

FIG. 6A is a representation of another example tracking apparatus 610 in accordance with some implementations. As shown in FIG. 6A, the tracking apparatus 610 includes a set of features 616 provided to serve as a beacon enabling optical discrimination of the tracking apparatus 610 in a first frequency band and to convey a data set associated with a first asset to which the tracking apparatus 610 is attached or adhered. For example, the set of features 616 is arranged according to a first instance of a predefined pattern (e.g., a 4×10 grid of dots) that conveys a serial number associated with the first asset. According to some implementations, portions 612-1, 612-2, 612-3, and 612-4 are provided to enable identification of at least one of the orientation or pitch of the tracking apparatus 610. As shown in FIG. 6A, portions 612-1, 612-2, and 612-3 are included in the set of features 616, and the portion 612-4 is a notch in the tracking apparatus 610 that occupies a respective corner of the tracking apparatus 610.

Figure 6B:
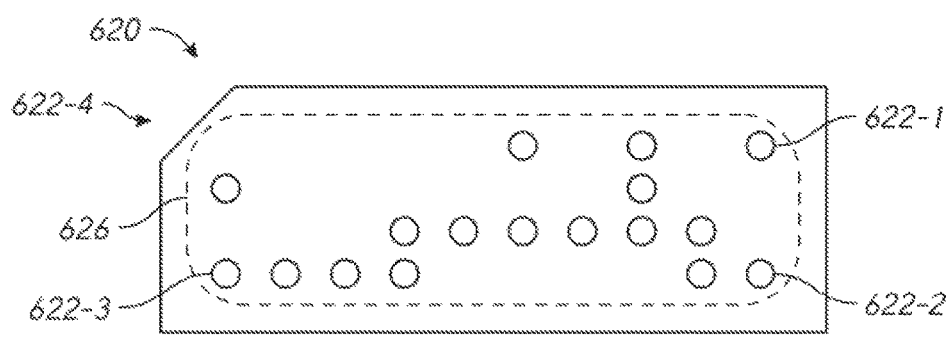

FIG. 6B is a representation of another example tracking apparatus 620 in accordance with some implementations. As shown in FIG. 6B, the tracking apparatus 620 includes a set of features 626 provided to serve as a beacon enabling optical discrimination of the tracking apparatus 620 in a first frequency band and to convey a data set associated with a second asset to which the tracking apparatus 620 is attached or adhered. For example, the set of features 626 is arranged according to a second instance of the predefined pattern that conveys a serial number associated with the second asset. According to some implementations, portions 622-1, 622-2, 622-3, and 622-4 are provided to enable identification of at least one of the orientation or pitch of the tracking apparatus 620. As shown in FIG. 6B, portions 622-1, 622-2, and 622-3 are included in the set of features 626, and the portion 622-4 is a notch in the tracking apparatus 620 that occupies a respective corner of the tracking apparatus 620.

Figure 6C:
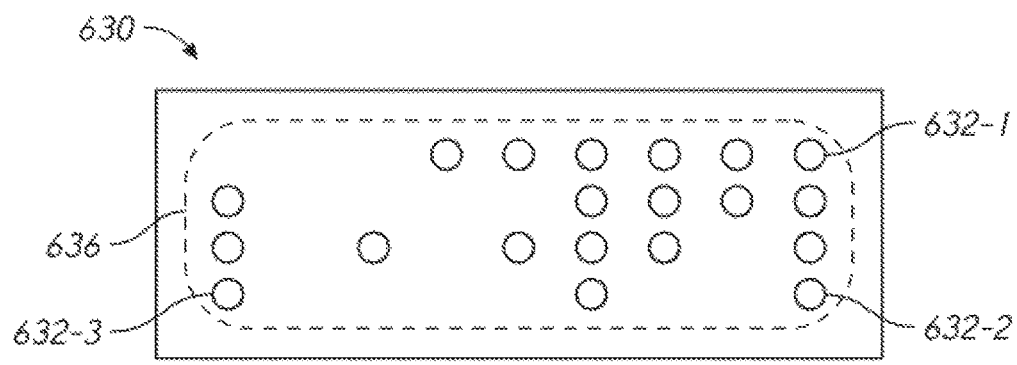

FIG. 6C is a representation of another example tracking apparatus 630 in accordance with some implementations. As shown in FIG. 6C, the tracking apparatus 630 includes a set of features 636 provided to serve as a beacon enabling optical discrimination of the tracking apparatus 630 in a first frequency band and to convey a data set associated with a third asset to which the tracking apparatus 630 is attached or adhered. For example, the set of features 636 is arranged according to a third instance of the predefined pattern that conveys a serial number associated with the third asset. According to some implementations, portions 632-1, 632-2, 632-3, and 632-4 are provided to enable identification of at least one of the orientation or pitch of the tracking apparatus 630. As shown in FIG. 6C, portions 632-1, 632-2, 632-3, and 632-4 are included in the set of features 636.

Figure 6D:
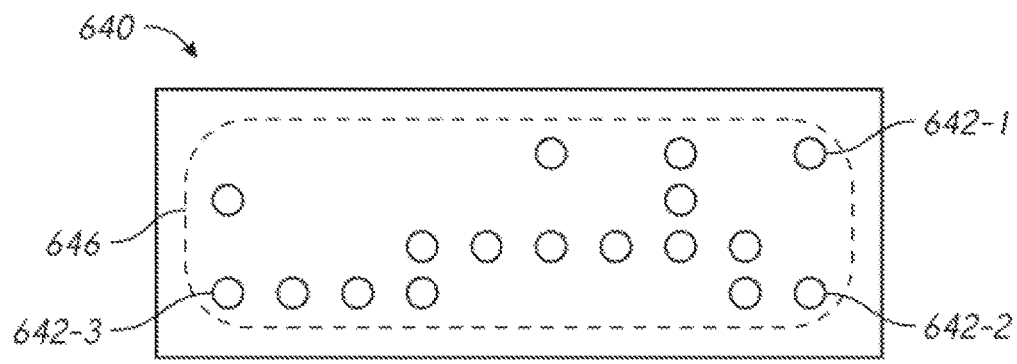

FIG. 6D is a representation of another example tracking apparatus 640 in accordance with some implementations. As shown in FIG. 6D, the tracking apparatus 640 includes a set of features 646 provided to serve as a beacon enabling optical discrimination of the tracking apparatus 640 in a first frequency band and to convey a data set associated with a fourth asset to which the tracking apparatus 640 is attached or adhered. For example, the set of features 646 is arranged according to a fourth instance of the predefined pattern that conveys a serial number associated with the fourth asset. According to some implementations, portions 642-1, 642-2, 642-3, and 642-4 are provided to enable identification of at least one of the orientation or pitch of the tracking apparatus 640. As shown in FIG. 6D, portions 642-1, 642-2, 642-3, and 642-4 are included in the set of features 646.

FIG. 7 is a representation of yet another example tracking apparatus 700 in accordance with some implementations. The tracking apparatus 700 in FIG. 7 is similar to and adapted from the tracking apparatus 500 in FIG. 5. While pertinent features are shown, those of ordinary skill in the art will appreciate from the present disclosure that various other features have not been illustrated for the sake of brevity and so as not to obscure more pertinent aspects of the example implementations disclosed herein. To that end, the tracking apparatus 700 includes: a substrate 708; a first feature including portions 704-1, 704-2, 704-3, and 704-4 (collectively referred to as the "first feature 704" herein) on a first side of the substrate 708; a second feature 706 on the first side of the substrate 708; and an optional third feature including portions 702-1, 702-2, 702-3, and 702-4 (collectively referred to as the "third feature 702" herein) on a first side of the substrate 708.

In some implementations, the first feature 704 is provided to serve as a beacon enabling optical discrimination of the tracking apparatus 700 in a first optical domain characterized by a first frequency range. For example, the first frequency range corresponds to the infrared (IR) frequency band. In some implementations, the first feature 704 is formed from a material that fluoresces when excited by electromagnetic radiation associated with the first frequency range such as the IR band. In some implementations, the first feature 704 is formed from a material that reflects or retro-reflects electromagnetic radiation associated with the first frequency range such as the IR band.

In some implementations, the second feature 706 is provided to convey a data set associated with the tracking apparatus 700 in a second optical domain characterized by a second frequency range. For example, the second frequency range corresponds to the visible spectrum. In some implementations, the second feature 706 is plain text, an image, a QR code, a barcode, or the like identifies the asset to which the tracking apparatus 700 is attached or adhered (e.g., a serial number or identity code). In some implementations, the second feature 706 is plain text, encoded text, an image, a QR code, a barcode, or the like, which characterizes the asset to which the tracking apparatus 700 is attached or adhered.

In some implementations, the third feature 702 is provided to enable identification of at least one of the orientation or pitch of the tracking apparatus 700. According to some implementations, the second feature 706 is distinct from the first feature 704 and the third feature 702. In some implementations, the third feature 702 is included in the first feature 704.

Figure 8:
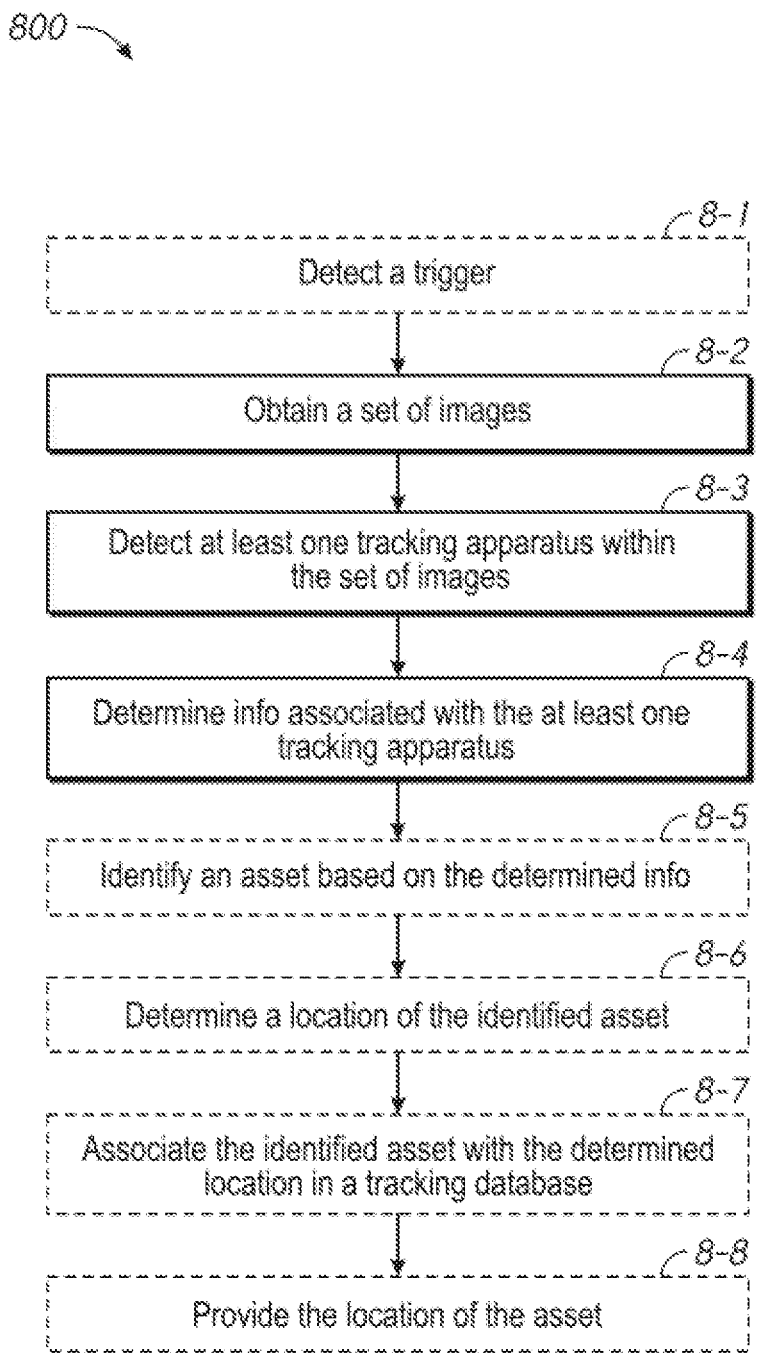
FIG. 8 is a flowchart representation of a method of asset tracking in accordance with some implementations.

FIG. 8 is a flowchart representation of a method 800 of asset tracking in accordance with some implementations. In various implementations, the method 800 is performed by a controller (e.g., the controller 210 in FIGS. 2 and 3). While pertinent features are shown, those of ordinary skill in the art will appreciate from the present disclosure that various other features have not been illustrated for the sake of brevity and so as not to obscure more pertinent aspects of the example implementations disclosed herein. To that end, briefly, in some circumstances, the method 800 includes: obtaining a set of images; detecting at least one tracking apparatus within the set of images; and determining information associated with the at least one tracking apparatus.

In some implementations, as represented by block 8-1, the method 800 optionally includes detecting a trigger. For example, with reference to FIG. 3, the controller 210 or a component thereof (e.g., the control module 312) obtains a trigger to perform the method 800. For example, the trigger is a request from a requestor (e.g., the network application 215 in FIG. 2) for a location of a specified asset within the operating environment 100. In another example, the trigger is a predefined schedule for updating the locations of assets within the operating environment 100. In some implementations, in response to obtaining the trigger, the controller 210 or a component thereof (e.g., the control module 312) instructs each of the capture devices 112 to capture at least one image. For example, each of the capture devices 112 captures an image of at least a portion of the operating environment 100 in response to the instruction. In some implementations, each of the capture devices 112 captures at least one image of at least a portion of the operating environment 100 according to a predefined schedule (e.g., every 30, 90, 120, etc. seconds).

As represented by block 8-2, the method 800 includes obtaining a set of images (e.g., one or more images). For example, with reference to FIG. 3, the controller 210 or a component thereof (e.g., the data obtaining module 314) obtains (e.g., receives or retrieves) a set of images from the capture devices 112. For example, the set of images includes at least one image from each of the capture devices 112. For example, the set of images were captured in a first optical domain characterized by a first frequency range (e.g., the infrared (IR) band).

As represented by block 8-3, the method 800 includes detecting at least one tracking apparatus within the set of images. For example, with reference to FIG. 3, the controller 210 or a component thereof (e.g., the detecting unit 332) detects at least one tracking apparatus within one or more images in the set of images. In one example, with reference to FIGS. 3 and 5, the detecting unit 332 detects the tracking apparatus 500 by identifying the first element 504 within one or more IR images in the set of IR images when the first element 504 reflects electromagnetic radiation associated with the IR band. In another example, with reference to FIGS. 3 and 5, the detecting unit 332 detects the tracking apparatus 500 by identifying the first element 504 within one or more visible spectrum images in the set of visible spectrum images when the first element 504 fluoresces electromagnetic radiation associated with the visible spectrum in response to being excited by electromagnetic radiation associated with the IR band. In yet another example, with reference to FIGS. 3 and 5, the detecting unit 332 detects the tracking apparatus 500 by identifying the first element 504 within one or more IR images in the set of IR images when the first element 504 fluoresces electromagnetic radiation associated with the IR band in response to being excited by electromagnetic radiation associated with the visible spectrum.

As represented by block 8-4, the method 800 includes determining information associated with the at least one tracking apparatus. For example, with reference to FIG. 3, the controller 210 or a component thereof (e.g., the determining unit 334) determines information associated with the at least one tracking apparatus (e.g., a serial number for an asset to which the at least one tracking apparatus is attached or adhered). For example, with reference to FIGS. 3 and 5, the determining unit 334 determines information associated with the tracking apparatus 500 by identifying the second element 506 within one or more IR images in the set of IR images and decoding the predetermined pattern associated with the second element 506.

In some implementations, as represented by block 8-5, the method 800 optionally includes identifying an asset based on the determined information associated with the at least one tracking apparatus. For example, with reference to FIG. 3, the controller 210 or a component thereof (e.g., the identifying unit 338) identifies an asset (e.g., a person, fixture, or person) based on the determined information associated with the at least one tracking apparatus. For example, with reference to FIGS. 3 and 4, the identifying unit 338 identifies entry 410-A within the tracking database 225 that is associated with the asset to which the at least one tracking apparatus is attached or adhered because the determined information matches the identification information 401-A. Continuing with this example, the characterization information 402-A in the entry 410-A includes information that identifies and characterizes the asset that corresponds to the entry 410-A.

In some implementations, as represented by block 8-6, the method 800 optionally includes determining a location of the identified asset. For example, with reference to FIG. 3, the controller 210 or a component thereof (e.g., the locating unit 336) locates the asset associated with the at least one tracking apparatus based on the position of the at least one tracking apparatus in one or more IR images among the set of IR images. For example, the locating unit 336 uses one of a plurality of known localization techniques to determine coordinates (e.g., absolute coordinates or coordinates relative to the operating environment 100) for the asset associated with the at least one tracking apparatus based on the position of the at least one tracking apparatus in one or more IR images among the set of IR images and known positions and/or settings (e.g., tilt, pan, and zoom parameters) for the capture devices 112.

In some implementations, as represented by block 8-7, the method 800 optionally includes associating the identified asset with the determined location in a tracking database. For example, with reference to FIG. 3, the controller 210 or a component thereof (e.g., the associating unit 340) associates the identified asset with the determined location in the tracking database 225. For example, with reference to FIGS. 3 and 4, the identified asset corresponds to entry 410-B. Continuing with this example, for the current instance (e.g., time T), the associating unit 340 associates the identified asset with tracking information 404-B-2 (e.g., a set of coordinates and a timestamp associated with time T). Continuing with this example, for a previous instance (e.g., time T−1), the associating unit 340 associated the identified asset with tracking information 404-B-1 (e.g., a set of coordinates and a timestamp associated with time T−1).

In some implementations, as represented by block 8-8, the method 800 optionally includes providing the location of the asset. For example, with reference to FIG. 3, the controller 210 or a component thereof provides an indication of the location of the asset associated with the at least one tracking apparatus. In another example, with reference to FIG. 3, the controller 210 or a component thereof provides an indication of the location of the asset associated with the at least one tracking apparatus to the requestor (e.g., the network application 215 in FIG. 2) according to a determination that the asset associated with the at least one tracking apparatus corresponds to the specified asset in the request.

Figure 9:
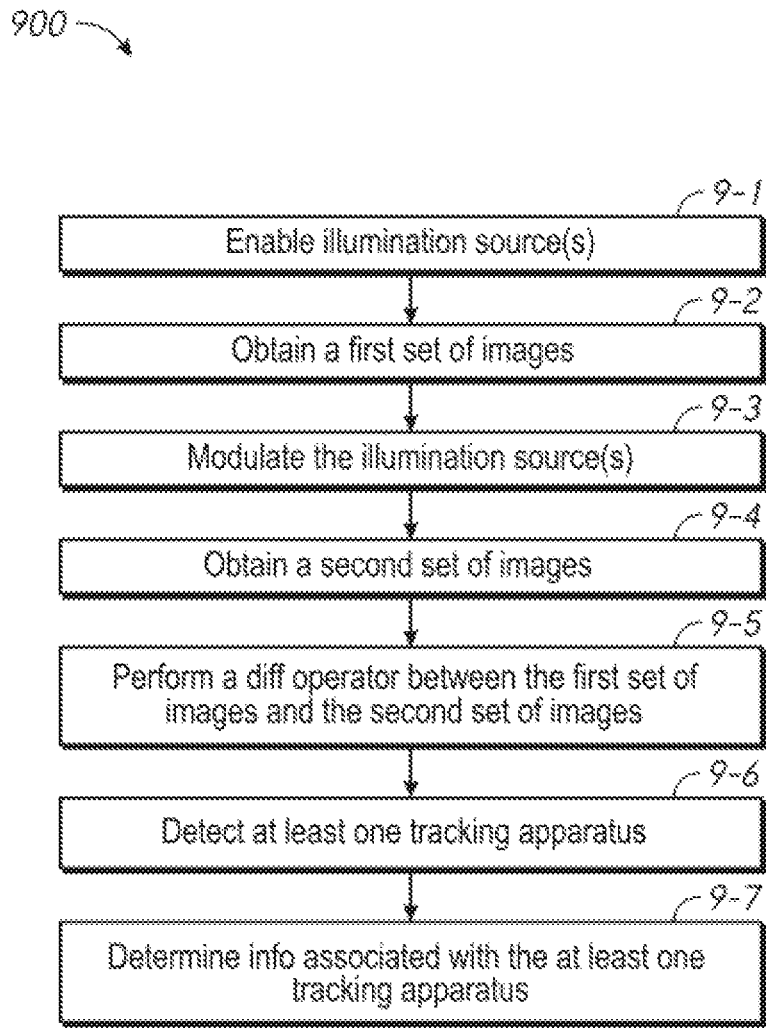
FIG. 9 is a flowchart representation of another method of asset tracking in accordance with some implementations.

FIG. 9 is a flowchart representation of a method 900 of asset tracking in accordance with some implementations. In various implementations, the method 900 is performed by a controller (e.g., the controller 210 in FIGS. 2 and 3). While pertinent features are shown, those of ordinary skill in the art will appreciate from the present disclosure that various other features have not been illustrated for the sake of brevity and so as not to obscure more pertinent aspects of the example implementations disclosed herein. To that end, briefly, in some circumstances, the method 900 includes: enabling one or more illumination sources; obtaining a first set of images; modulating the one or more illumination sources; obtaining a second set of images; performing a difference operation between the first set of images and the second set of images; detecting at least one tracking apparatus; and determining information associated with the at least one tracking apparatus.

As represented by block 9-1, the method 900 includes enabling one or more illumination sources. For example, with reference to FIG. 3, the controller 210 or a component thereof (e.g., the control module 312) enables the illumination sources 102. In some implementations, the control module 312 enables the illumination sources 102 by sending an enable instruction to the illumination sources 102. For example, the enable instruction includes an enable length (e.g., a period of X seconds), a brightness value (e.g., N lumens), a frequency range (e.g., emit electromagnetic radiation associated with the IR band), and/or the like.

As represented by block 9-2, the method 900 includes obtaining a first set of images. For example, with reference to FIG. 3, the controller 210 or a component thereof (e.g., the data obtaining module 314) obtains (e.g., receives or retrieves) a first set of images from the capture devices 112 (e.g., at least one image from each of the capture devices 112). For example, the first set of images were captured in a first optical domain characterized by a first frequency range (e.g., the infrared (IR) band). Continuing with this example, the first set of images were captured in the first optical domain while the illumination sources 102 were enabled (e.g., emitting IR energy) according to block 9-1. In some implementations, the first set of images is filtered by an optical passband filter that passes the optical frequency associated with the illumination sources 102 and blocks other frequencies in order to reduce background illumination and noise.

As represented by block 9-3, the method 900 includes modulating the one or more illumination sources. For example, with reference to FIG. 3, the controller 210 or a component thereof (e.g., the control module 312) disables the illumination sources 102. In some implementations, the control module 312 disables the illumination sources 102 by sending a disable instruction to the illumination sources 102. In another example, with reference to FIG. 3, the controller 210 or a component thereof (e.g., the control module 312) sends a subsequent instruction to the illumination sources 102 to adjust the brightness value, the frequency range, and/or the like of the illumination sources 102.

As represented by block 9-4, the method 900 includes obtaining a second set of images. For example, with reference to FIG. 3, the controller 210 or a component thereof (e.g., the data obtaining module 314) obtains (e.g., receives or retrieves) a second set of s from the capture devices 112 (e.g., at least one image from each of the capture devices 112). For example, the first set of images were captured in the first optical domain characterized by the first frequency range (e.g., the infrared (IR) band). Continuing with example, the second set of images were captured in the first optical domain while the illumination sources 102 were modulated according to block 9-3 (e.g., disabled or otherwise adjusted). In some implementations, the second set of images are filtered by an optical passband filter that passes the optical frequency associated with the illumination sources 102 and blocks other frequencies in order to reduce background illumination and noise.

As represented by block 9-5, the method 900 includes performing a difference operation between the first set of images and the second set of images. For example, with reference to FIG. 3, the controller 210 or a component thereof (e.g., the processing module 330) performs a difference or subtraction operation between the first set of images and the second set of images. For example, the difference operation is performed in order to filter out false positives and/or background and ambient noise.

As represented by block 9-6, the method 900 includes detecting at least one tracking apparatus. According to some implementations, block 9-6 is similar to and adapted from block 8-3 in FIG. 8. As such, it will not be discussed again for the sake of brevity.

As represented by block 9-7, the method 900 includes determining information associated with the at least one tracking apparatus. According to some implementations, block 9-7 is similar to and adapted from block 8-4 in FIG. 8. As such, it will not be discussed again for the sake of brevity.

Figure 10:
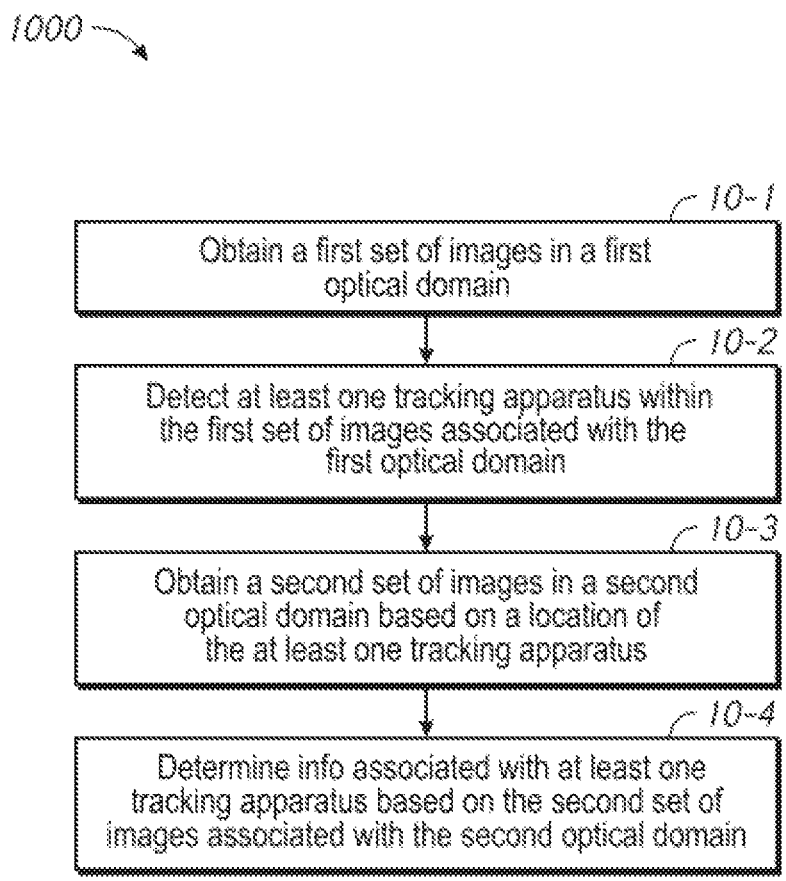
FIG. 10 is a flowchart representation of yet another method of asset tracking in accordance with some implementations.

FIG. 10 is a flowchart representation of yet another method 1000 of asset tracking in accordance with some implementations. In various implementations, the method 1000 is performed by a controller (e.g., the controller 210 in FIGS. 2 and 3). While pertinent features are shown, those of ordinary skill in the art will appreciate from the present disclosure that various other features have not been illustrated for the sake of brevity and so as not to obscure more pertinent aspects of the example implementations disclosed herein. To that end, briefly, in some circumstances, the method 1000 includes: obtaining a first set of images in a first optical domain; detecting at least one tracking apparatus within the first set of images associated with the first optical domain; obtaining a second set of images in a second optical domain based on the location of the at least one tracking apparatus; and determining information associated with the at least one tracking apparatus based on the second set of images associated with the second optical domain.

As represented by block 10-1, the method 1000 includes obtaining a first set of images in a first optical domain. For example, with reference to FIG. 3, the controller 210 or a component thereof (e.g., the data obtaining module 314)

obtains (e.g., receives or retrieves) a first set of images in the first optical domain from the capture devices 112 (e.g., at least one image from each of the capture devices 112). For example, the first optical domain is characterized by a first frequency range (e.g., the infrared (IR) band).

As represented by block 10-2, the method 1000 includes detecting at least one tracking apparatus within the first set of images associated with the first optical domain. For example, with reference to FIG. 3, the controller 210 or a component thereof (e.g., the detecting unit 332) detects at least one tracking apparatus within the first set of images. According to some implementations, with reference to FIGS. 3 and 5, the detecting unit 332 detects the tracking apparatus 500 by identifying the first element 504 within one or more IR images in the first set of IR images.

In some implementations, with reference to FIG. 3, the controller 210 or a component thereof (e.g., the processing unit 330) determines a location for the at least one tracking apparatus within the first set of images. In some implementations, the controller 210 or a component thereof (e.g., the control module 312) instructs one or more of the capture devices 112 to capture at least one image in a second optical domain (e.g., the visible spectrum) isolating the at least one tracking apparatus based on the location of the at least one tracking apparatus in the first set of images. For example, one or more of the capture devices 112 capture an image of at least a portion of the operating environment 100 in the second optical domain focusing on or zooming into the location of the at least tracking apparatus in response to the instruction.

As represented by block 10-3, the method 1000 includes obtaining a second set of images in a second optical domain based on the location of the at least one tracking apparatus. For example, with reference to FIG. 3, the controller 210 or a component thereof (e.g., the data obtaining module 314) obtains (e.g., receives or retrieves) a second set of images in the second optical domain from the capture devices 112 e.g., at least one image from each of the capture devices 112). For example, the second optical domain is characterized by a second frequency range (e.g., the visible spectrum). For example, the second set of more images focus on or zoom into the location of the at least tracking apparatus.

As represented by block 10-4, the method 1000 includes determining information associated with the at least one tracking apparatus based on the second set of images associated with the second optical domain. For example, with reference to FIG. 3, the controller 210 or a component thereof (e.g., the determining unit 334) determines information associated with the at least one tracking apparatus (e.g., a serial number for an asset to which the at least one tracking apparatus is attached or adhered) based on the second set of images in the second optical domain. According to some implementations, with reference to FIGS. 3 and 7, the determining unit 334 determines information associated with the tracking apparatus 700 by identifying the second feature 706 within the second set of visible spectrum images and optionally decoding the predetermined pattern associated with the second feature 706 (e.g., a QR code, barcode, plain text code, and/or the like).

Figure 11:
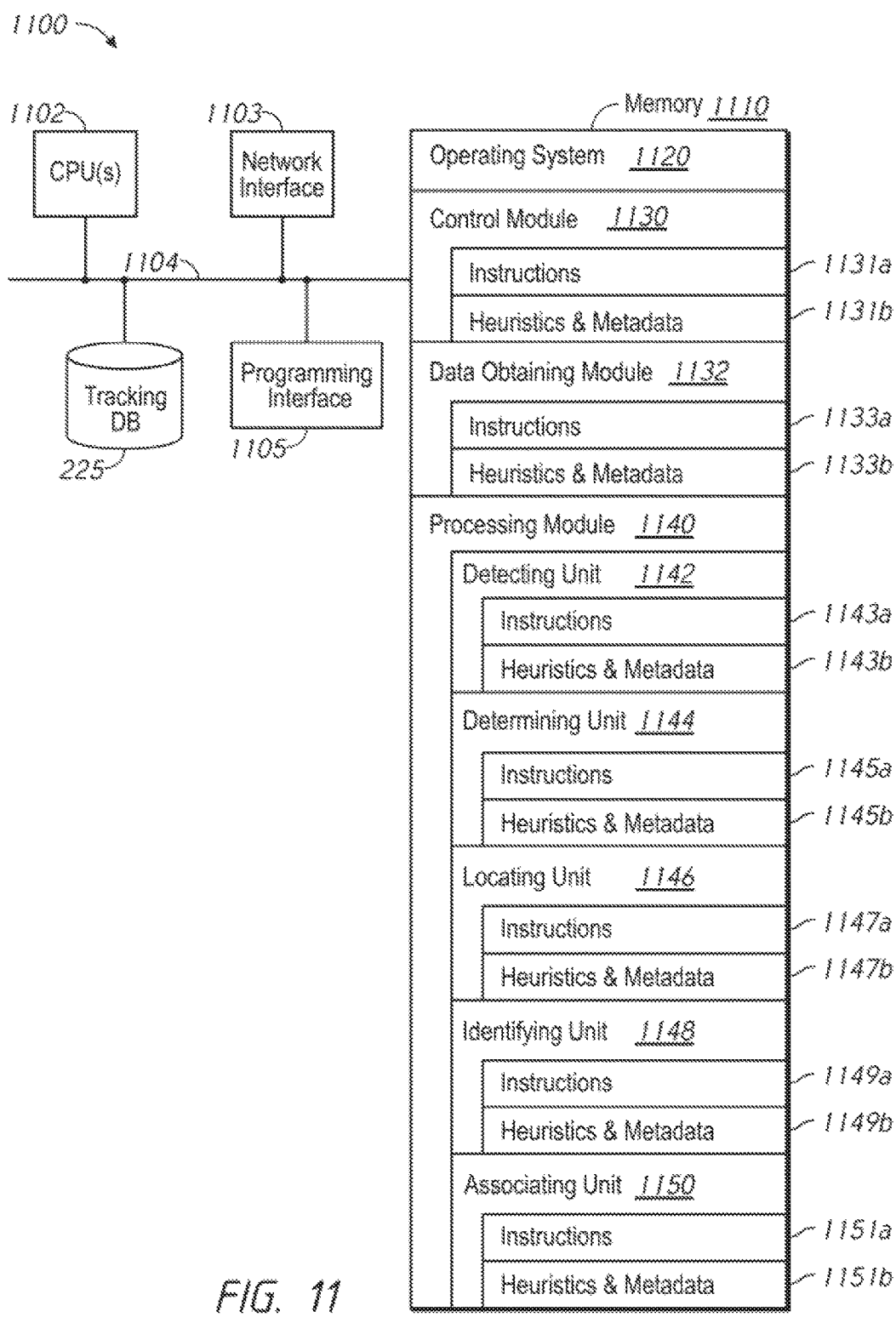
FIG. 11 is a block diagram of an example device in accordance with some implementations.

FIG. 11 is a block diagram of an example of a device 1100 in accordance with some implementations. For example, in some implementations, the device 1100 is similar to and adapted from the controller 210 in FIGS. 2 and 3. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1100 includes one or more processing units (CPUs) 1102, a network interface 1103, a programming (I/O) interface 1105, a memory 1110, a tracking database 225, and one or more communication buses 1104 for interconnecting these and various other components.

In some implementations, the one or more communication buses 1104 include circuitry that interconnects and controls communications between system components. The tracking database 225 stores a plurality of entries each of which corresponds to a unique asset (e.g., an object, fixture, or person). In some implementations, each entry of the tracking database 225 is characterized by following fields: identification information, characterization information, and one or more instances of location information. The tracking database 225 is described in more detail above with reference to FIG. 4.

The memory 1110 includes high-speed random access memory, such as DRAM, SRAM, DDR RAM, or other random access solid state memory devices. In some implementations, the memory 1110 includes non-volatile memory, such as one or more magnetic disk storage devices, optical disk storage devices, flash memory devices, or other non-volatile solid state storage devices. The memory 1110 optionally includes one or more storage devices remotely located from the one or more CPUs 1102. The memory 1110 comprises a non-transitory computer readable storage medium. In some implementations, the memory 1110 or the non-transitory computer readable storage medium of the memory 1110 stores the following programs, modules and data structures, or a subset thereof including an optional operating system 1120, a control module 1130, a data obtaining module 1132, and a processing module 1140.

The operating system 1120 includes procedures for handling various basic system services and for performing hardware dependent tasks.

In some implementations, the control module 1130 is configured to control the operation of the illumination sources 102 and the capture devices 112 within the operating environment 100. To that end, in various implementations, the control module 1130 includes instructions and/or logic 1131*a*, and heuristics and metadata 1131*b*. According to some implementations, the control module 1130 is similar to and adapted from the control module 312 in FIG. 3.

In some implementations, the data obtaining module 1132 is configured to obtains images from the capture devices 112. To that end, in various implementations, the data obtaining module 1132 includes instructions and/or logic 1133*a*, and heuristics and metadata 1133*b*. According to some implementations, the data obtaining module 1132 is similar to and adapted from the data obtaining module 314 in FIG. 3.

In some implementations, the processing module 1140 is configured to facilitate the tracking of assets within the operating environment 100. According to some implementations, the processing module 1140 is similar to and adapted from the processing module 330 in FIG. 3. According to some implementations, the processing module 1140 includes: a detecting unit 1142, a determining unit 1144, a locating unit 1146, an identifying unit 1148, and an associating unit 1150.

In some implementations, the detecting unit 1142 is configured to detect one or more tracking apparatuses (e.g., tags) within the images obtained by the data obtaining module 1132. To that end, in various implementations, the detecting unit 1142 includes instructions and/or logic 1143*a*, and heuristics and metadata 1143b. According to some implementations, the detecting unit 1142 is similar to and adapted from the detecting unit 332 in FIG. 3.

In some implementations, the determining unit 1144 is configured to determine information associated with the one or more tracking apparatuses detected by the detecting unit 1142. To that end, in various implementations, the determining unit 1144 includes instructions and/or logic 1145a, and heuristics and metadata 1145b. According to some implementations, the determining unit 1144 is similar to and adapted from the determining unit 334 in FIG. 3.

In some implementations, the locating unit 1146 is configured to determine a location for each of the assets associated with the one or more tracking apparatuses detected by the detecting unit 1142. To that end, in various implementations, the locating unit 1146 includes instructions and/or logic 1147a, and heuristics and metadata 1147b. According to some implementations, the locating unit 1146 is similar to and adapted from the locating unit 336 in FIG. 3.

In some implementations, the identifying unit 1148 is configured to identify an asset associated with each of the one or more tracking apparatuses based on the information for each of the one or more tracking apparatuses determined by the determining unit 1144. To that end, in various implementations, the identifying unit 1148 includes instructions and/or logic 1149a, and heuristics and metadata 1149b. According to some implementations, the identifying unit 1148 is similar to and adapted from the identifying unit 338 in FIG. 3.

In some implementations, the associating unit 1150 is configured to associate the locations determined by the locating unit 1146 with entries in the tracking database 225 that correspond to the assets identified by the identifying unit 1148. To that end, in various implementations, the associating unit 1150 includes instructions and/or logic 1151a, and heuristics and metadata 1151b. According to some implementations, the associating unit 1150 is similar to and adapted from the associating unit 340 in FIG. 3.

Although the control module 1130, the data obtaining module 1132, and the processing module 1140 are shown as residing on a single device (i.e., the device 1100), it should be understood that in other implementations, any combination of the control module 1130, the data obtaining module 1132, and the processing module 1140 reside in separate computing devices. For example, each of the control module 1130, the data obtaining module 1132, and the processing module 1140 reside on a separate device.

Moreover, FIG. 11 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 11 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first set of features could be termed a second set of features, and, similarly, a second set of features could be termed a first set of features, which changing the meaning of the description, so long as all occurrences of the "first set of features" are renamed consistently and all occurrences of the "second set of features" are renamed consistently. The first set of features and the second set of features are both sets of features, but they are not the same set of features.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. An apparatus comprising:
   a surface;
   a non-data-encoding feature on the surface provided to serve as a beacon enabling optical discrimination of the apparatus in an infrared frequency band and identification of at least one of the orientation or pitch of the apparatus; and
   a data-encoding feature on the surface provided to convey a data set associated with the apparatus in a visible frequency band, wherein the data-encoding feature is distinct from the non-data-encoding feature.

2. The apparatus of claim 1, wherein the non-data-encoding feature is configured to reflect electromagnetic radiation in the infrared frequency band.

3. The apparatus of claim 1, wherein the non-data-encoding feature is configured to fluoresce when excited by electromagnetic in the infrared frequency band.

4. The apparatus of claim 1, wherein the data set characterizes an asset that corresponds to the apparatus.

5. The apparatus of claim 1, further comprising:
a substrate including the surface, wherein the surface is provided on a first side of the substrate.

6. The apparatus of claim 5, further comprising:
an adhesive provided on a second side of the substrate, wherein the adhesive is provided to adhere the apparatus to an asset.

7. The apparatus of claim 1, wherein the non-data-encoding feature includes a first portion on a first side of the data-encoding feature and a second portion on a second side of the data-encoding feature opposite the first side of the data-encoding feature.

8. The apparatus of claim 7, wherein the first portion differs from the second portion enabling identification of at least one of the orientation or pitch of the apparatus.

9. The apparatus of claim 1, wherein the non-data-encoding feature includes a first portion proximal to the data-encoding feature, a second portion proximal to the data-encoding feature and spaced apart from the first portion in a first direction, and a third portion proximal to the data-encoding feature and spaced apart from the first portion in a second direction perpendicular to the first direction.

10. A method comprising:
obtaining a first image in a first optical domain, wherein the first optical domain is characterized by an infrared frequency range;
detecting a tracking apparatus within the first image in the first optical domain, wherein a non-data-encoding feature of the tracking apparatus serves as a beacon enabling optical discrimination of the tracking apparatus in the infrared frequency range and identification of at least one of the orientation or pitch of the apparatus;
obtaining a second image in a second optical domain, wherein the second optical domain is characterized by a visible frequency range; and
determining information associated with the tracking apparatus based on the arrangement of a data-encoding feature of the tracking apparatus within the second image in the second optical domain, wherein the data-encoding feature is distinct from the non-data-encoding feature.

11. The method of claim 10, wherein the data set characterizes an asset that corresponds to the tracking apparatus.

12. The method of claim 11, further comprising:
determining an identity for the asset based on the determined information;
determining a location for the asset; and
associating the location with the identity for the asset in a tracking database.

13. The method of claim 11, further comprising:
obtaining an instruction to identify a location of a specified asset; and
wherein obtaining the first image comprises obtaining the first image in the first optical domain in response to receiving the instruction.

14. The method of claim 13, further comprising:
determining an identity for the asset based on the determined information;
determining a location for the asset;
associating the location with the identity for the asset in a tracking database; and
providing the location of the asset according to a determination that the identity of the asset matches the specified asset.

15. The method of claim 10, further comprising:
enabling one or more illumination sources to illuminate an area associated with the tracking apparatus, wherein the one or more illumination sources emit electromagnetic energy corresponding to the infrared frequency range; and
wherein capturing the first image in the first optical domain comprises capturing the first image in the first optical domain while the one or more illumination sources are enabled.

16. The method of claim 15, further comprising:
modulating the one or more illumination sources;
capturing a second image in the first optical domain while the one or more illumination sources are modulated; and
wherein detecting the tracking apparatus comprises performing a difference operation between the first image and the second image in order to detect the tracking apparatus.

17. The method of claim 10, where determining information associated with the tracking apparatus is further based on the at least one of the orientation and pitch of the tracking apparatus.

18. A non-transitory memory storing one or more programs, which, when executed by one or more processors of a device, cause the device to:
obtain a first image in a first optical domain, wherein the first optical domain is characterized by an infrared frequency range;
detect a tracking apparatus within the first image in the first optical domain, wherein a non-data-encoding feature of the tracking apparatus serves as a beacon enabling optical discrimination of the tracking apparatus in the infrared frequency range and identification of at least one of the orientation or pitch of the apparatus; and
obtaining a second image in a second optical domain, wherein the second optical domain is characterized by a visible frequency range;
determine information associated with the tracking apparatus based on the arrangement of a data-encoding feature of the tracking apparatus within the second image in the second optical domain, wherein the data-encoding feature is distinct from the non-data-encoding feature.

* * * * *